United States Patent
Ha et al.

(10) Patent No.: US 12,233,715 B2
(45) Date of Patent: *Feb. 25, 2025

(54) METHOD AND DEVICE FOR CONTROLLING DISPLAY ON BASIS OF DRIVING CONTEXT

(71) Applicant: Samsung Electronics Co., Ltd., Gyeonggi-do (KR)

(72) Inventors: Taeyoung Ha, Gyeonggi-do (KR); Sungkwon Kim, Gyeonggi-do (KR); Juyeon You, Gyeonggi-do (KR); Deokyeol Lee, Gyeonggi-do (KR); Sungwook Lee, Gyeonggi-do (KR); Changyoul Lee, Gyeonggi-do (KR); Yongjun Lim, Gyeonggi-do (KR); Jaemo Choi, Gyeonggi-do (KR); Jinyoung Choi, Gyeonggi-do (KR); Kwaneui Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,239

(22) Filed: Jun. 1, 2023

(65) Prior Publication Data
US 2023/0302906 A1 Sep. 28, 2023

Related U.S. Application Data

(63) Continuation of application No. 16/955,898, filed as application No. PCT/KR2018/015412 on Dec. 6, 2018, now Pat. No. 11,718,175.

(30) Foreign Application Priority Data

Dec. 21, 2017 (KR) .................. 10-2017-0176848

(51) Int. Cl.
*B60K 35/00* (2024.01)
*B60K 35/10* (2024.01)
(Continued)

(52) U.S. Cl.
CPC .............. *B60K 35/00* (2013.01); *B60K 35/10* (2024.01); *B60K 35/22* (2024.01); *B60K 35/28* (2024.01);
(Continued)

(58) Field of Classification Search
CPC ........ B60K 35/00; B60K 35/10; B60K 35/22; B60K 35/28; B60K 35/29; B60K 35/53;
(Continued)

(56) References Cited

U.S. PATENT DOCUMENTS 6,812,942 B2 11/2004 Ribak
6,956,540 B1 10/2005 Yoshihara et al.
(Continued)

FOREIGN PATENT DOCUMENTS

CN 105404003 3/2016
CN 105751994 7/2016
(Continued)

OTHER PUBLICATIONS

European Search Report dated Nov. 24, 2023 issued in counterpart application No. 23186042.0-1012, 4 pages.
(Continued)

*Primary Examiner* — Douglas M Wilson
(74) *Attorney, Agent, or Firm* — The Farrell Law Firm, P.C.

(57) ABSTRACT

Methods and devices are provided for use in a vehicle. Driving information of the vehicle is obtained. The driving information includes transmission state information of the vehicle and information for an autonomous driving function. When the transmission state information indicates a position
(Continued)

other than drive, a size of an exposed region of a first display is controlled to be a first size. When the transmission state information indicates drive and the driving information indicates that the autonomous driving function is enabled, the exposed region of the first display is controlled to be a second size that is less than the first size. When the transmission state information indicates drive and the driving information indicates that the autonomous driving function is disabled, the exposed region of the first display is controlled to be less than the second size.

20 Claims, 13 Drawing Sheets

(51) Int. Cl.
| | |
|---|---|
| B60K 35/28 | (2024.01) |
| B60K 35/29 | (2024.01) |
| B60K 35/53 | (2024.01) |
| B60K 35/60 | (2024.01) |
| B60K 35/81 | (2024.01) |
| B60R 11/00 | (2006.01) |
| B60W 40/02 | (2006.01) |
| B60W 50/14 | (2020.01) |
| G02B 27/01 | (2006.01) |
| B60K 35/22 | (2024.01) |
| B60K 35/65 | (2024.01) |

(52) U.S. Cl.
CPC ............ *B60K 35/29* (2024.01); *B60K 35/53* (2024.01); *B60K 35/60* (2024.01); *B60K 35/65* (2024.01); *B60K 35/81* (2024.01); *B60K 2360/11* (2024.01); *B60K 2360/164* (2024.01); *B60K 2360/172* (2024.01); *B60K 2360/175* (2024.01); *B60K 2360/182* (2024.01); *B60K 2360/1868* (2024.01); *B60K 2360/1876* (2024.01); *B60R 2011/0092* (2013.01); *B60W 40/02* (2013.01); *B60W 50/14* (2013.01); *B60W 2050/146* (2013.01); *G02B 2027/0183* (2013.01)

(58) Field of Classification Search
CPC ........ B60K 35/60; B60K 35/65; B60K 35/81; B60K 2360/11; B60K 2360/164; B60K 2360/172; B60K 2360/175; B60K 2360/182; B60K 2360/1868; B60K 2360/1876; B60K 35/223; B60K 2360/139; B60R 2011/0092; B60W 40/02; B60W 50/14; B60W 2050/146; B60W 30/14; G02B 2027/0183; F16H 2063/423; B60Y 2300/14
See application file for complete search history.

(56) References Cited

U.S. PATENT DOCUMENTS

| | | | |
|---|---|---|---|
| 7,006,881 | B1 | 2/2006 | Hoffberg et al. |
| 7,136,710 | B1 | 11/2006 | Hoffberg et al. |
| 7,315,291 | B2 | 1/2008 | Yoshihara et al. |
| 7,966,078 | B2 | 6/2011 | Hoffberg et al. |
| 7,974,714 | B2 | 7/2011 | Hoffberg |
| 8,606,516 | B2 | 12/2013 | Vertelney et al. |
| 9,008,856 | B2 | 4/2015 | Ricci |
| 9,239,951 | B2 | 1/2016 | Hoffberg et al. |
| 9,290,096 | B2 * | 3/2016 | Park .................... B60K 35/00 |
| 9,434,255 | B2 | 9/2016 | BendeWald et al. |
| 9,442,619 | B2 | 9/2016 | Geyer |
| 9,518,835 | B2 | 12/2016 | Vertelney et al. |
| 9,547,985 | B2 | 1/2017 | Tuukkanen |
| RE46,310 | E | 2/2017 | Hoffberg et al. |
| 9,731,720 | B2 | 8/2017 | Seo |
| 10,086,762 | B2 | 10/2018 | Uhm |
| 10,144,289 | B2 | 12/2018 | Les et al. |
| 10,146,357 | B2 | 12/2018 | BendeWald et al. |
| 10,197,154 | B2 | 2/2019 | Sutton et al. |
| 10,362,230 | B2 | 7/2019 | Watanabe |
| 10,650,787 | B2 | 5/2020 | Kim et al. |
| 11,718,175 | B2 * | 8/2023 | Ha .................... B60K 35/223 |
| | | | 701/36 |
| 2002/0085043 | A1 | 7/2002 | Ribak |
| 2006/0287826 | A1 | 12/2006 | Shimizu |
| 2007/0061735 | A1 | 3/2007 | Hoffberg et al. |
| 2011/0029922 | A1 | 2/2011 | Hoffberg et al. |
| 2012/0150651 | A1 | 6/2012 | Hoffberg et al. |
| 2013/0144461 | A1 | 6/2013 | Ricci |
| 2013/0144462 | A1 | 6/2013 | Ricci |
| 2014/0025263 | A1 | 1/2014 | Geyer |
| 2014/0089241 | A1 | 3/2014 | Hoffberg et al. |
| 2014/0129092 | A1 | 5/2014 | Mori et al. |
| 2014/0142852 | A1 | 5/2014 | Vertelney et al. |
| 2014/0180537 | A1 | 6/2014 | Ng et al. |
| 2015/0224877 | A1 | 8/2015 | BendeWald et al. |
| 2016/0089979 | A1 | 3/2016 | Bianchi et al. |
| 2016/0103319 | A1 | 4/2016 | Remillard |
| 2016/0125735 | A1 | 5/2016 | Tuukkanon |
| 2016/0127887 | A1 | 5/2016 | Ricci |
| 2016/0188190 | A1 | 6/2016 | Ricci |
| 2016/0193924 | A1 * | 7/2016 | Kim .................... G02B 27/01 |
| | | | 296/70 |
| 2016/0196800 | A1 * | 7/2016 | Kim ................... G06F 3/04886 |
| | | | 715/788 |
| 2016/0231855 | A1 | 8/2016 | BendeWald et al. |
| 2016/0311323 | A1 | 10/2016 | Lea et al. |
| 2016/0355133 | A1 | 12/2016 | Kim et al. |
| 2017/0113552 | A1 | 4/2017 | Bianchi et al. |
| 2017/0146357 | A1 | 5/2017 | Vertelney et al. |
| 2017/0349098 | A1 | 12/2017 | Uhm |
| 2018/0060253 | A1 | 3/2018 | Gao |
| 2019/0126942 | A1 | 5/2019 | Goto et al. |

FOREIGN PATENT DOCUMENTS

| | | |
|---|---|---|
| DE | 19722944 | 6/1998 |
| EP | 3 024 681 | 6/2016 |
| EP | 3 095 635 | 11/2016 |
| FR | 2971878 | 8/2012 |
| JP | 2001-118369 | 4/2001 |
| JP | 2006-082691 | 3/2006 |
| JP | 2013-083793 | 5/2013 |
| JP | 2017-200812 | 11/2017 |
| KR | 1020120025229 | 3/2012 |
| KR | 10-2012-0085973 | 8/2012 |
| KR | 10-2016-0053678 | 5/2016 |
| KR | 10-2016-0127492 | 11/2016 |
| KR | 10-2016-0142167 | 12/2016 |
| KR | 10-2017-0027162 | 3/2017 |
| KR | 10-2017-0027163 | 3/2017 |
| KR | 10-2017-0047044 | 5/2017 |
| KR | 1020170055739 | 5/2017 |
| WO | WO 2012/046294 | 4/2012 |
| WO | WO 2015/011229 | 1/2015 |
| WO | WO 2015/072013 | 5/2015 |

OTHER PUBLICATIONS

Indian Hearing Notice dated Sep. 10, 2023 issued in counterpart application No. 202027024723, 2 pages.
PCT/ISA/210 Search Report issued on PCT/KR2018/015412, Mar. 12, 2019, pp. 5.
PCT/ISA/237 Written Opinion issued on PCT/KR2018/015412, Mar. 12, 2019, pp. 8.
European Search Report dated Dec. 7, 2020 issued in counterpart application No. 18890154.0-1012, 7 pages.
Korean Office Action dated Jun. 27, 2022 issued in counterpart application No. 10-2017-0176848, 18 pages.

(56) References Cited

OTHER PUBLICATIONS

Korean Office Action dated Oct. 20, 2022 issued in counterpart application No. 10-2017-0176848, 5 pages.
Chinese Office Action dated Jun. 3, 2023 issued in counterpart application No. 201880081606.9, 26 pages.
Chinese Office Action dated May 1, 2024 issued in counterpart application No. 201880081606.9, 21 pages.
Chinese Office Action dated Feb. 7, 2024 issued in counterpart application No. 201880081606.9, 20 pages.

* cited by examiner

METHOD AND DEVICE FOR CONTROLLING DISPLAY ON BASIS OF DRIVING CONTEXT

PRIORITY

This application is a Continuation Applications of U.S. application Ser. No. 16/955,898, filed in the U.S. Patent and Trademark Office on Jun. 19, 2020, which is a National Phase Entry of PCT International Application No. PCT/KR2018/015412, which was filed on Dec. 6, 2018, and claims priority to Korean Patent Application No. 10-2017-0176848, which was filed on Dec. 21, 2017, the entire content of each of which is incorporated herein by reference.

BACKGROUND

1. Field

Embodiments disclosed in this specification relate to a method and a device for controlling a display based on a driving context.

2. Description of Related Art

Nowadays, various functions for improving the convenience of a driver are mounted in a transportation device (e.g., a vehicle). For example, the transportation device may include a cluster (e.g., an instrument panel) capable of displaying information associated with driving information. Furthermore, the transportation device may include an in-vehicle infotainment (IVI) system for playing various pieces of information and multimedia. To provide such the infotainment system, a center information display (CID) is widely used in addition to a cluster. Besides, as the amount of information to be displayed increases, the size of such the CID increases.

As the size of a CID increases, more various pieces of information may be provided through the CID. However, the increase in the CID may disperse a driver's gaze. Unlike the cluster positioned in the gaze direction of the driver (e.g., the same direction as a traveling direction), the CID is generally positioned at the center of a dashboard. Accordingly, when the driver watches the CID on driving, the probability that a safety problem occurs may increase. In particular, as the size of the CID increases, the possibility that the driver's attention is dispersed may increase.

Furthermore, the CID may receive a touch input. A lot of functions (e.g., the temperature control in a vehicle, or the like) may be performed by the CID depending on the increase of the size of the CID. However, the increase in the size of the CID may mean the increase in a user's movement for input in addition to the increase in the size of a user interface (UI). When an input is attempted through the CID on driving, it may be difficult for the driver to enter an accurate input due to the increased movement.

SUMMARY

Various embodiments disclosed in the specification provide a control method of an IVI system that increases a driver's convenience while the driver's attention is less dispersed, and an electronic device thereof.

According to an embodiment, an information displaying device for use in a vehicle includes a first display and a driving unit configured to control a size of an exposed region of the first display. The device also includes a processor configured to control the first display and the driving unit. The processor is configured to obtain driving information of the vehicle. The driving information includes transmission state information of the vehicle and information for an autonomous driving function. When the transmission state information indicates a position other than drive, the processor is configured to control the size of the exposed region of the first display to be a first size, using the driving unit. When the transmission state information indicates drive and the driving information indicates that the autonomous driving function is enabled, the processor is configured to control the exposed region of the first display to be a second size that is less than the first size, using the driving unit. When the transmission state information indicates drive and the driving information indicates that the autonomous driving function is disabled, the processor is configured to control the exposed region of the first display to be less than the second size, using the driving unit.

Furthermore, according to an embodiment, a method of controlling an information displaying device for use in a vehicle is provided. Driving information of the vehicle is obtained. The driving information includes transmission state information of the vehicle and information for an autonomous driving function. When the transmission state information indicates a position other than drive, a size of an exposed region of a first display is controlled to be a first size. When the transmission state information indicates drive and the driving information indicates that the autonomous driving function is enabled, the exposed region of the first display is controlled to be a second size that is less than the first size. When the transmission state information indicates drive and the driving information indicates that the autonomous driving function is disabled, the exposed region of the first display is controlled to be less than the second size.

According to various embodiments disclosed in the specification, a user experience may be improved by changing a display depending on a driving context.

Furthermore, according to various embodiments, the simple and accurate input may be performed on driving by changing an input means depending on a driving context.

Besides, a variety of effects directly or indirectly understood through the disclosure may be provided.

BRIEF DESCRIPTION OF THE DRAWINGS

With regard to description of drawings, the same or similar components may be marked by the same or similar reference numerals.

DETAILED DESCRIPTION

Figure 1:
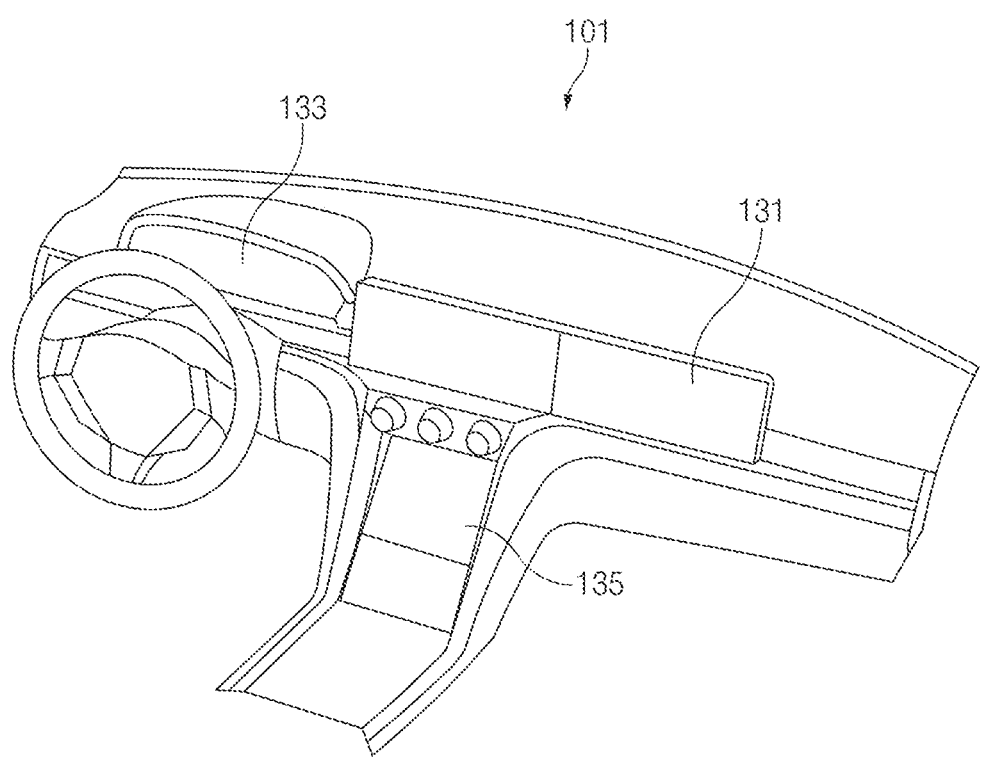
FIG. 1 illustrates a configuration of an electronic device according to various embodiments.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals. The terms of a singular form may include plural forms unless otherwise specified. In the disclosure, the expressions "A or B", or "at least one of A and/or B", and the like may include any and all combinations of one or more of the associated listed items. The terms, such as "first", "second" may be used to refer to various components regardless of the order and/or the priority and to distinguish the relevant components from other components, but do not limit the components. It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present.

According to the situation, the expression "configured to" used in the disclosure may be interchangeably used as, for example, in hardware or software, the expression "suitable for", "having the capacity to", "adapted to", "made to", "capable of", or "designed to". Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), or Motion Picture Experts Group (MPEG-1 or MPEG-2) Audio Layer 3 (MP3) players. According to various embodiments, the electronic device may include at least one of, for example, televisions (TVs), digital versatile disc (DVD) players, or electronic picture frames.

According to an embodiment, an electronic device may include at least one of navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, or head units for vehicles. According to an embodiment, the electronic device may include at least one of parts of vehicles or electronic boards. According to various embodiments, the electronic device may be flexible or two or more combinations of the above-described devices. Furthermore, an electronic device according to an embodiment of the disclosure may not be limited to the above-described electronic devices. In the disclosure, the term "user" may refer to a person who uses an electronic device or may refer to a device (e.g., an artificial intelligence electronic device) that uses the electronic device.

FIG. 1 illustrates a configuration of an electronic device according to various embodiments.

In the following embodiments, a transportation device may be referred to as a device that transports people or things. For example, the transportation device may be a car, a ship, or an aircraft.

Referring to FIG. 1, according to an embodiment, the transportation device may include an electronic device 101. For example, the electronic device 101 may collect information associated with the transportation device or may provide a user with the collected information. Further, the electronic device 101 may perform various controls associated with the operation of the transportation device. The electronic device 101 may be configured in various forms to be operatively and/or electrically connected to the electronic device.

According to an embodiment, the electronic device 101 may be at least part of an in-vehicle infotainment (IVI) system of a transportation device (e.g., vehicle). In FIG. 1, the electronic device 101 has been illustrated as being included in the dashboard of a vehicle, but the electronic device 101 may further include other components (e.g., the display at the rear seat, or the like) not illustrated in FIG. 1.

According to an embodiment, the electronic device 101 may include at least one cluster screen 133 (e.g., instrument panel) and a CID 131. For example, the electronic device 101 may include at least one auxiliary display 135 in addition to the above-described configuration.

According to an embodiment, the cluster screen 133 may be composed of at least one display. For example, the cluster screen 133 may be composed of a plurality of displays. The cluster screen 133 may be configured to receive a touch input. According to another embodiment, the cluster screen 133 may also include at least one mechanical component (e.g., a gauge and/or a needle indicator). For example, the cluster screen 133 may display some information (e.g., speed and/or the number of revolutions of an engine), using a physical number plate and indicator hands, and some information may be displayed by using a display region.

According to an embodiment, the electronic device 101 may at least display information associated with the operation of the transportation device on the cluster screen 133. For example, the electronic device 101 may display at least one of the driving speed of the transportation device, the number of revolutions of an engine (e.g., RPM (revolution per minute)), fuel efficiency, mileage, drivable distance, fuel gauge, or gear status, on the cluster screen 133. According to another embodiment, the electronic device 101 may display information associated with the driving mode of the transportation device on the cluster screen 133. For example, the information associated with the driving mode may include a sport mode, a sport plus mode, a comfort mode, or an eco-mode. According to still another embodiment, the electronic device 101 may display information associated with the autonomous mode of the transportation device on the cluster screen 133. For example, the information associated with the autonomous mode may include information associated with at least one of auto pilot, cruise control, adaptive/advanced cruise control, or lane departure warning (LDW).

According to an embodiment, the electronic device 101 may display the information associated with at least one application on the cluster screen 133. For example, the electronic device 101 may display information associated with a navigation application on the cluster screen 133. According to another embodiment, the electronic device 101 may display information associated with weather (e.g., outside temperature) and/or time on the cluster screen 133.

According to an embodiment, the electronic device 101 may display various pieces of information through the CID 131. For example, the electronic device 101 may display information associated with various applications through the CID 131. The electronic device 101 may display information associated with at least one application through the CID 131. For example, the electronic device 101 may display the information associated with the navigation application on the CID 131. For another example, the electronic device 101 may play various media (e.g., music, movies, texts, and/or images) through the CID 131. In addition, the electronic device 101 may display at least one of the information capable of being displayed on the above-described cluster screen 133, on the CID 131.

According to an embodiment, the CID 131 may include various types of displays. For example, the CID 131 may include a liquid crystal display (LCD), an organic light emitting diode (OLED) display, a flexible display, a foldable display, or a rollable display.

According to an embodiment, the electronic device 101 may receive a touch input through the CID 131. For example, the electronic device 101 may receive an input to information displayed on the CID 131, through the CID 131. According to another embodiment, the electronic device 101 may receive an input to information displayed on the CID 131, through voices, gestures, and/or auxiliary input means.

According to an embodiment, the electronic device 101 may control the size of a externally exposed region of the CID 131. For example, the electronic device 101 may change the size of the exposed region of the CID 131 by protruding the CID 131 from above the dashboard cover or by raising at least part of the dashboard cover. For example, the change of the exposed region side may include the change of the size of the region of the CID 131 exposed to a user from the dashboard, the curvature change of the CID 131, or the size change of the display region of the CID 131 for one direction.

According to an embodiment, the electronic device 101 may display various pieces of information on the auxiliary display 135. For example, the electronic device 101 may display information associated with the internal environmental state of the transportation device (e.g., temperature, wind strength, or the like) and/or the internal environmental state control (e.g., temperature control, air conditioning control, chair heating/cooling control, wind strength, or the like). For another example, the electronic device 101 may display at least one of the above-described information in connection with the CID 131 or the cluster screen 133, on the auxiliary display 135.

In the present disclosure, the term "auxiliary display" may be to distinguish from the CID 131, and the auxiliary display may refer to one of CIDs. For example, the first CID may be referred to as the CID 131 and the second CID may be referred to as the auxiliary display 135.

Various displays (e.g., 131, 133, and 135) of the electronic device 101 have been described with reference to FIG. 1. As described above, each of the displays (e.g., 131, 133, and 135) may receive a touch input. According to an embodiment, an input to information displayed on each display (e.g., 131, 133, and 135) may be received through the auxiliary input device. Hereinafter, various auxiliary input devices are described with reference to FIG. 2.

Figure 2:
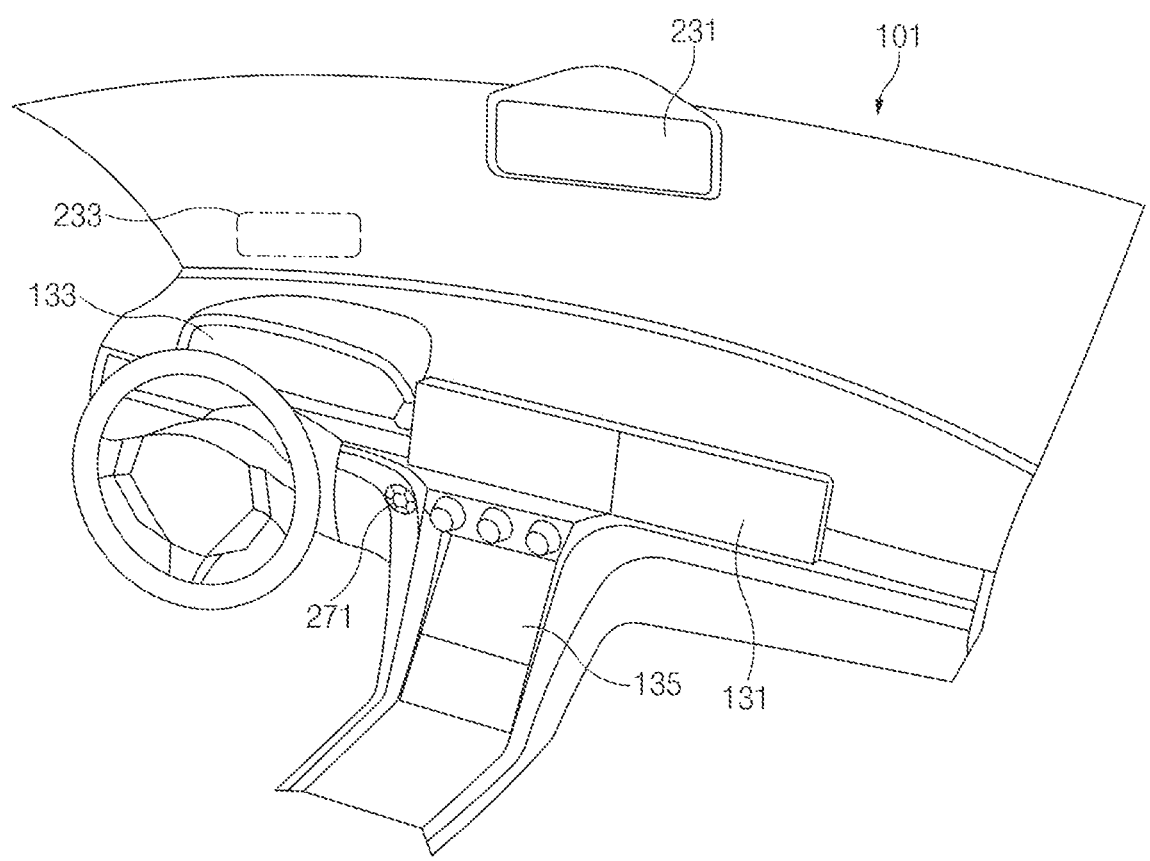
FIG. 2 illustrates an in-vehicle multimedia system according to various embodiments.

FIG. 2 illustrates an in-vehicle multimedia system according to various embodiments.

Referring to FIG. 2, according to an embodiment, the electronic device 101 may include a plurality of auxiliary displays. For convenience of description, each of the auxiliary displays may be referred to as the first auxiliary display 135, a second auxiliary display 231, and a third auxiliary display 233. The description of the first auxiliary display 135 may be referred to by the description associated with FIG. 1. For example, the second auxiliary display 231 may display information on at least part of a room mirror. Furthermore, for example, the third auxiliary display 233 may be a head up display (HUD) displayed on the windshield of the transportation device. The plurality of auxiliary displays 135, 231, and 233 illustrated in FIG. 2 are examples, and the electronic device 101 may not include an auxiliary display or may include at least one auxiliary display.

According to an embodiment, the electronic device 101 may include at least one auxiliary input device (e.g., an auxiliary input device 271). The auxiliary input device 271 may include at least one button. For example, the auxiliary input device 271 may include one or more buttons capable of receiving a touch input and/or a push input. For example, the auxiliary input device 271 may be implemented with a plurality of buttons arranged in each directions and a central button for receiving a selection input. The auxiliary input device 271 may be referred to as a peripheral user interface (PUI).

Figure 3:
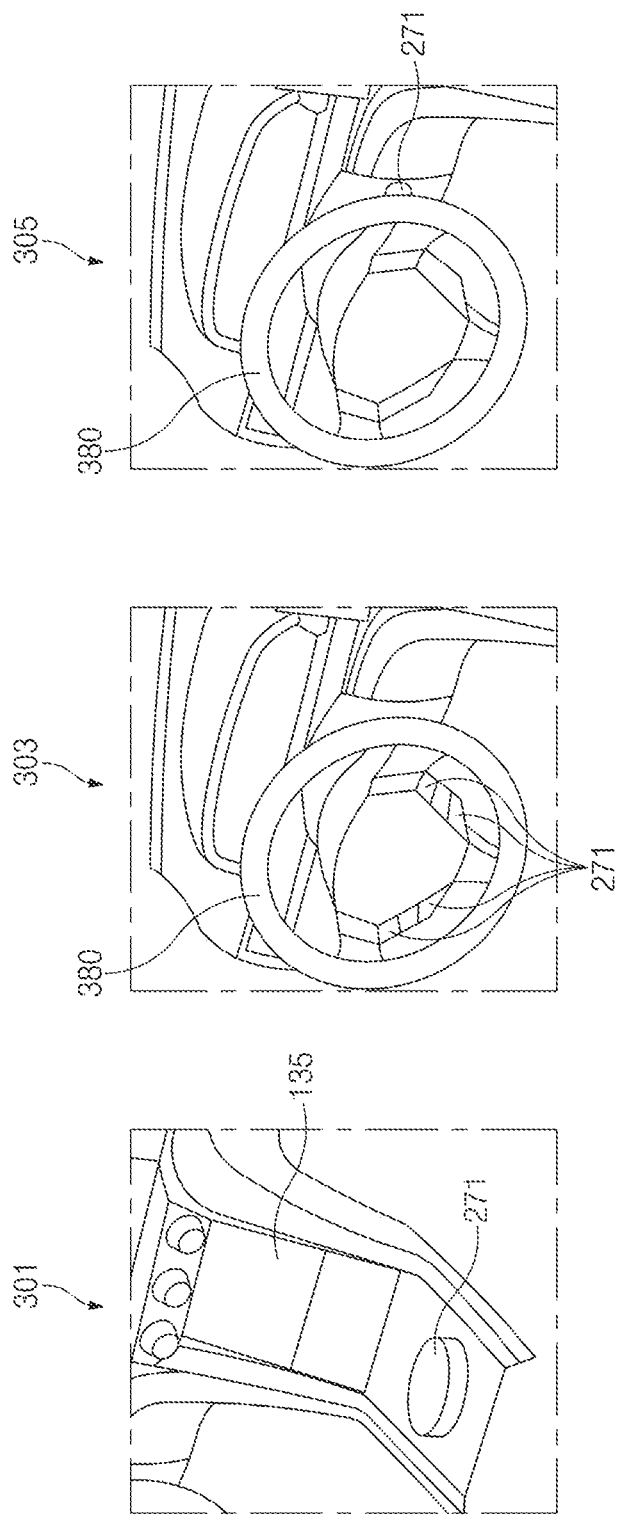
FIG. 3 illustrates an auxiliary input means according to various embodiments.

The example of the auxiliary input device 271 has been described with reference to FIG. 2. However, the shape of the auxiliary input device 271 is not limited thereto. Referring to FIG. 3, various embodiments of the auxiliary input device 271 are described.

FIG. 3 illustrates an auxiliary input device according to various embodiments.

Referring to reference numeral 301, the auxiliary input device 271 according to an embodiment may be a knob capable of receiving a push input, a touch input, and/or a rotation input. For example, the auxiliary input device 271 may be a jog-shuttle. In reference numeral 301, the auxiliary input device 271 has been illustrated as being positioned at the lower portion of the auxiliary display 135, but the location of the auxiliary input device 271 is not limited thereto.

With reference to reference numeral 303, the auxiliary input device 271 according to an embodiment may be implemented with at least one button capable of receiving a push input. For example, the auxiliary input device 271 may be positioned on a steering device 380 (e.g., a steering wheel).

Referring to reference numeral 305, the auxiliary input device 271 according to an embodiment may be an input means positioned adjacent to the steering device 380. For example, the auxiliary input device 271 may be positioned at the rear side of the steering device 380 and may include a plurality of buttons and/or wheels.

Various examples of the auxiliary input device 271 have been described with reference to FIG. 3. The electronic device 101 may include one or more of the auxiliary input devices 271. For example, the electronic device 101 may include auxiliary input devices according to FIG. 2, reference numeral 301 in FIG. 3, reference numeral 303 in FIG. 3, and/or reference numeral 305 in FIG. 3.

The external configurations of the electronic device 101 have been described with reference to FIGS. 1 to 3. Hereinafter, the internal configuration of the electronic device 101 will be described with reference to FIG. 4.

Figure 4:
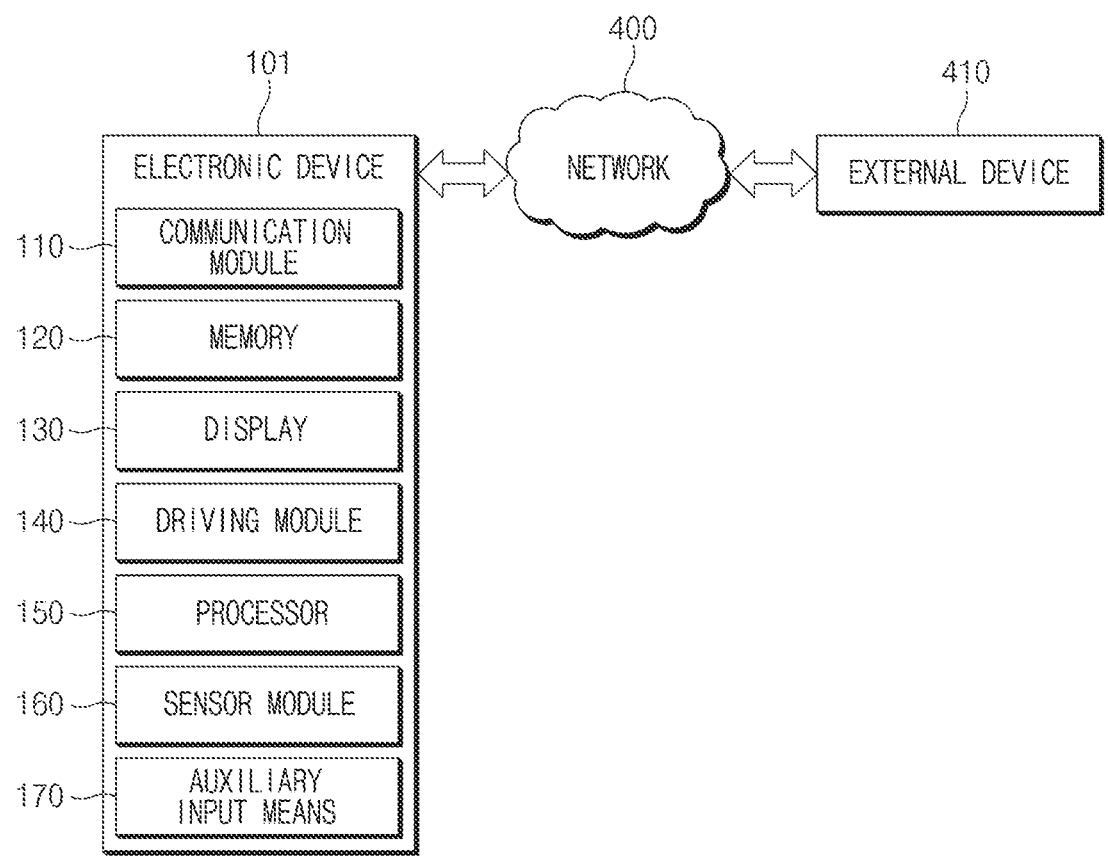
FIG. 4 is a block diagram of an electronic device in a wireless environment according to various embodiments.

FIG. 4 is a block diagram of an electronic device in a wireless environment according to various embodiments.

According to an embodiment, the electronic device 101 may include a communication module 110, a memory 120, a display 130, a driving module 140, a processor 150, a sensor module 160, and an auxiliary input means 170. The electronic device 101 may communicate with an external device 410 over a network 400. For example, the network 400 may include a short range network (e.g., Bluetooth, Bluetooth low energy, ZigBee, ultra-wideband (UWB) communication, or Wi-Fi) or a long range network (e.g., cellular network or satellite communication).

According to an embodiment, the electronic device 101 may further include a configuration (e.g., a sound output device or a voice receiving device) not illustrated in FIG. 4. According to another embodiment, at least one of the configurations illustrated in FIG. 4 may be omitted. Also, at least part of the configurations of the electronic device 101 may be implemented as an integrated component.

According to an embodiment, the communication module 110 may establish a wired or wireless communication channel between the electronic device 101 and the external device 410 and may support communication execution through the established communication channel. The communication module 110 may include at least one communication processor operating independently from the processor 150 and supporting the wired communication or the wireless communication. According to an embodiment, the communication module 110 may include a wireless communication module (e.g., a cellular communication module, a short range wireless communication module, or a global navigation satellite system (GNSS) communication module) or a wired communication module (e.g., a local area network (LAN) communication module or a power line communication module) and may communicate with at least one external electronic device (e.g., the external device 410) over the network 400, using the corresponding communication module thereof. The above-mentioned various communication modules 110 may be implemented into one chip or into separate chips, respectively.

The memory 120 may store various pieces of data, for example, software and input data or output data for instructions associated with the software, which are used by at least one component (e.g., the processor 150 or the sensor module 160) of the electronic device 101. The memory 120 may include a volatile memory or a nonvolatile memory. The memory 120 may store at least one software (e.g., operating system, middleware, and/or applications).

The display 130 may be a device for visually providing information to a user of the electronic device 101 and may include, for example, a display, a hologram device, or a control circuit for controlling a projector and a corresponding device. According to an embodiment, the display 130 may include a touch circuitry or a pressure sensor for measuring an intensity of pressure on the touch. According to an embodiment, the electronic device 101 may include at least one display. For example, the electronic device 101 may include the cluster screen 133 and the CID 131. For another example, the electronic device 101 may further include at least one auxiliary display (e.g., 135, 231, or 233).

For example, the driving module 140 may adjust the size of the exposed region of the display 130 (e.g., the CID 131) under control of the processor 150. To adjust the size of the exposed region, the driving module 140 may include a mechanical configuration capable of providing physical force. According to an embodiment, the driving module 140 may include a mechanical configuration for changing the position of the display 130. For example, the driving module 140 may change the size of the display 130 exposed through a dashboard, using a driving device such as an electric motor or a cylinder. According to another embodiment, the driving module 140 may include a mechanical configuration for changing the curvature of the display 130. For example, the driving module 140 may change the size of the display 130 exposed to a user's gaze direction by changing the curvature of the display 130. According to still another embodiment, the driving module 140 may include a mechanical configuration for changing the size of the display 130 for one direction. For example, the driving module 140 may adjust the size of the display 130 for one direction, by rolling up at least part of the display 130 or folding the at least part of the display 130.

For example, the processor 150 may operate software to control at least one other component (e.g., hardware or software component) of the electronic device 101 connected to the processor 150 and may process and calculate various types of data. The operations of the above-described electronic device 101 may be performed by the processor 150. The processor 150 may load commands or data received from other components (e.g., the sensor module 160 or the communication module 110) into the memory 120 (e.g., a volatile memory or a nonvolatile memory), may process the commands or the data, and may store the result data in the memory 120. According to an embodiment, the processor 150 may include at least one processor.

The sensor module 160 may generate an electrical signal or a data value corresponding to an internal operation state of the electronic device 101 and/or the transportation device or corresponding to an external environmental state. According to an embodiment, the sensor module 160 may include at least one of a gesture sensor, a gyro sensor, a barometric pressure sensor, a magnetic sensor, a speed sensor, a position sensor (e.g., a global positioning system), an acceleration sensor, a grip sensor, a proximity sensor, a color sensor, an infrared (IR) sensor, a biometric sensor, a temperature sensor, a humidity sensor, or an illuminance sensor. For example, the sensor module 160 may obtain information associated with a driving context of the transportation device.

For example, the auxiliary input means 170 may receive a user input, as a device for receiving instructions or data to be used for the component (e.g., the processor 150) of the electronic device 101 from the outside (e.g., a user) of the electronic device 101. For example, the auxiliary input means 170 may include the auxiliary input device 271 described above with regard to FIGS. 2 and 3.

At least part of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, the processor 150 may obtain the driving information of a vehicle, using the sensor module 160, and may control the size of the exposed region of the display 130 (e.g., the CID 131) based at least on the driving information, using the driving module 140. The processor 150 may set a user interface for receiving the user input associated with the content displayed on the first display to at least one of the display 130 or the auxiliary input means 170 based on the size of the exposed region.

For example, the driving information includes gear information of the vehicle, and gear information may include Drive, Neutral, Reverse, and Park. According to an embodiment, when the gear information is Neutral, Reverse, and Park, the processor 150 may be configured to control the exposed region of the display 130 to be a specified first size or more.

According to an embodiment, when the exposed region of the display 130 is not smaller than a specified first size, the processor 150 may set the display 130 as the user interface.

According to an embodiment, when the gear information is Drive, the processor 150 may be configured to control the exposed region of the display 130 to be less than the specified first size.

According to an embodiment, when the exposed region of the display 130 is smaller than the specified first size, the processor 150 may set the auxiliary input interface as the user interface.

According to an embodiment, when the gear information is Drive and the driving information indicates that autonomous function is disabled, the processor 150 may be configured to control the exposed region of the display 130 to be less than a specified second size. For example, the second size may be smaller than the first size.

According to an embodiment, when the exposed region of the display 130 is smaller than the specified second size, the processor 150 may be configured to display at least part of the content displayed on the display 130 on at least part of the second display (e.g., the cluster screen 133).

According to an embodiment, the processor 150 may be configured to change the type, amount, and layout of content displayed on the display 130 based on the size of the exposed region.

According to an embodiment, when a passenger's boarding is detected, the processor 150 may be configured to control the exposed region of the display 130 to be the specified first size or more.

According to an embodiment, the processor 150 may be configured to detect an external electronic device using a communication circuit and may detect the passenger's boarding based on an external electronic device.

The internal and external components of the electronic device 101 have been described above with reference to FIGS. 1 to 4. Hereinafter, the operations of the electronic device 101 will be described with reference to FIG. 5.

Figure 5:
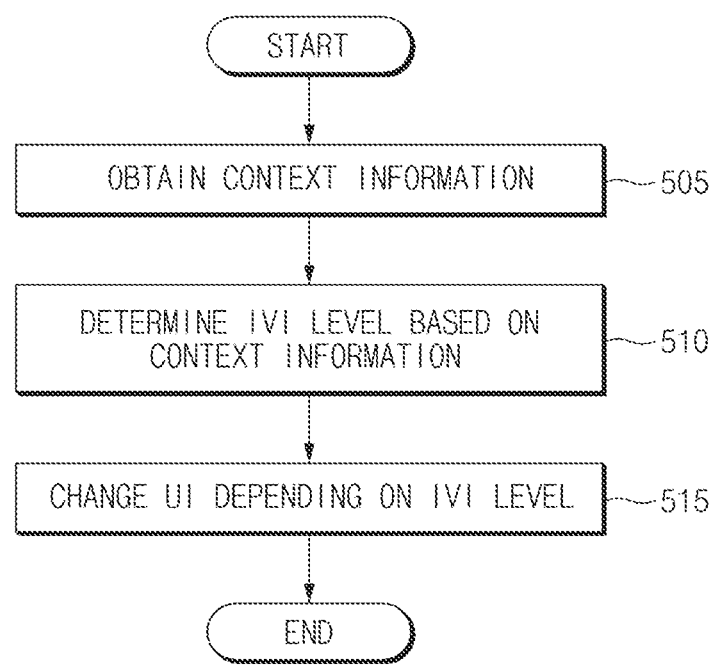
FIG. 5 is a flowchart of a UI changing method of an electronic device according to various embodiments.

FIG. 5 is a flowchart of a UI changing method of an electronic device according to various embodiments.

In operation 505, the processor 150 of the electronic device 101 may obtain context information associated with the driving of a transportation device. According to an embodiment, the processor 150 may obtain context information, using the sensor module 160 and/or the communication module 110. For example, the processor 150 may obtain information about the speed, acceleration, and/or location of the transportation device, using the sensor module 160. For another example, the processor 150 may connect to at least one external device (e.g., the external device 410), using the communication module 110 and may obtain information of the external device. According to another embodiment, the processor 150 may obtain information about the state of the shift gear (e.g., Park, Neutral, Drive, or Reverse), autonomous function settings (e.g., autopilot, advanced/adaptive cruise control, cruise control, lane departure warning, or the like), seat belt wearing, or driving mode (e.g., sports, comfort, or fuel efficiency) from a user input, the memory 120, or the sensor module 160.

In operation 510, the processor 150 may determine the IVI level based on context information. The IVI level may be composed of a plurality of levels. According to an embodiment, the processor 150 may determine the IVI level by determining the extent to which a driver needs attention from the context information. For example, when the context information satisfies a specified first condition, the processor 150 may determine the IVI level as the specified first level. For another example, when the context information satisfies a specified second condition, the processor 150 may determine the IVI level as the specified second level.

The processor 150 may determine the IVI level based on rules and/or exceptions having various priorities. According to an embodiment, the processor 150 may determine the IVI level based at least on a transmission state, an autonomous function, a driving mode, and/or whether a passenger is boarded. For example, when the transmission is positioned at Drive, the autonomous function is disabled, and the driving mode is sports, the processor 150 may determine that the IVI level is the first IVI level (e.g., the case where a driver needs to focus on driving). For another example, when the transmission is positioned at Drive, the autonomous function is enabled, and the driving mode is a comfort or eco mode, the processor 150 may determine that the IVI level is the second IVI level (e.g., the case where the driving situation does not require the driver's high attention). For another example, when the transmission is located at a position (e.g., Park, Reverse, or Neutral) other than Drive, the processor 150 may determine that the IVI level is the third IVI level (e.g., the case where the driving situation requires the driver's low attention). In the above-described examples, the state of the transmission may be defined as an exception. For example, only when the transmission is positioned at Drive, the processor 150 may determine the IVI level based on the remaining context information; when the transmission is positioned at a position other than Drive, the processor 150 may determine the IVI level irrespective of the remaining context information.

In operation 515, the processor 150 may change the UI depending on the IVI level. For example, the UI may mean the UI displayed on the display 130. According to an embodiment, the processor 150 may change the configuration of the UI, the shape and location of the display 130 of the UI, and/or the input means for the UI depending on the IVI level. For example, the processor 150 may change the configuration of the UI by changing the type, amount, and/or layout of information to be displayed based on the IVI level. For another example, the processor 150 may change the size of the exposed region of the display 130 based on the IVI level or may change a region where some information is to be displayed, from one display (e.g., the CID 131) to another display (e.g., the cluster screen 133 and/or the auxiliary display 135). For still another example, the processor 150 may change an input means for the UI from one input means (e.g., the display 130) to another input means (e.g., the auxiliary input means 170) based on the IVI level.

The UI change operations of the electronic device 101 have been described with regard to FIG. 5. Hereinafter, various embodiments associated with the UI change of the electronic device 101 will be described with reference to FIGS. 6 to 12.

Figure 6:
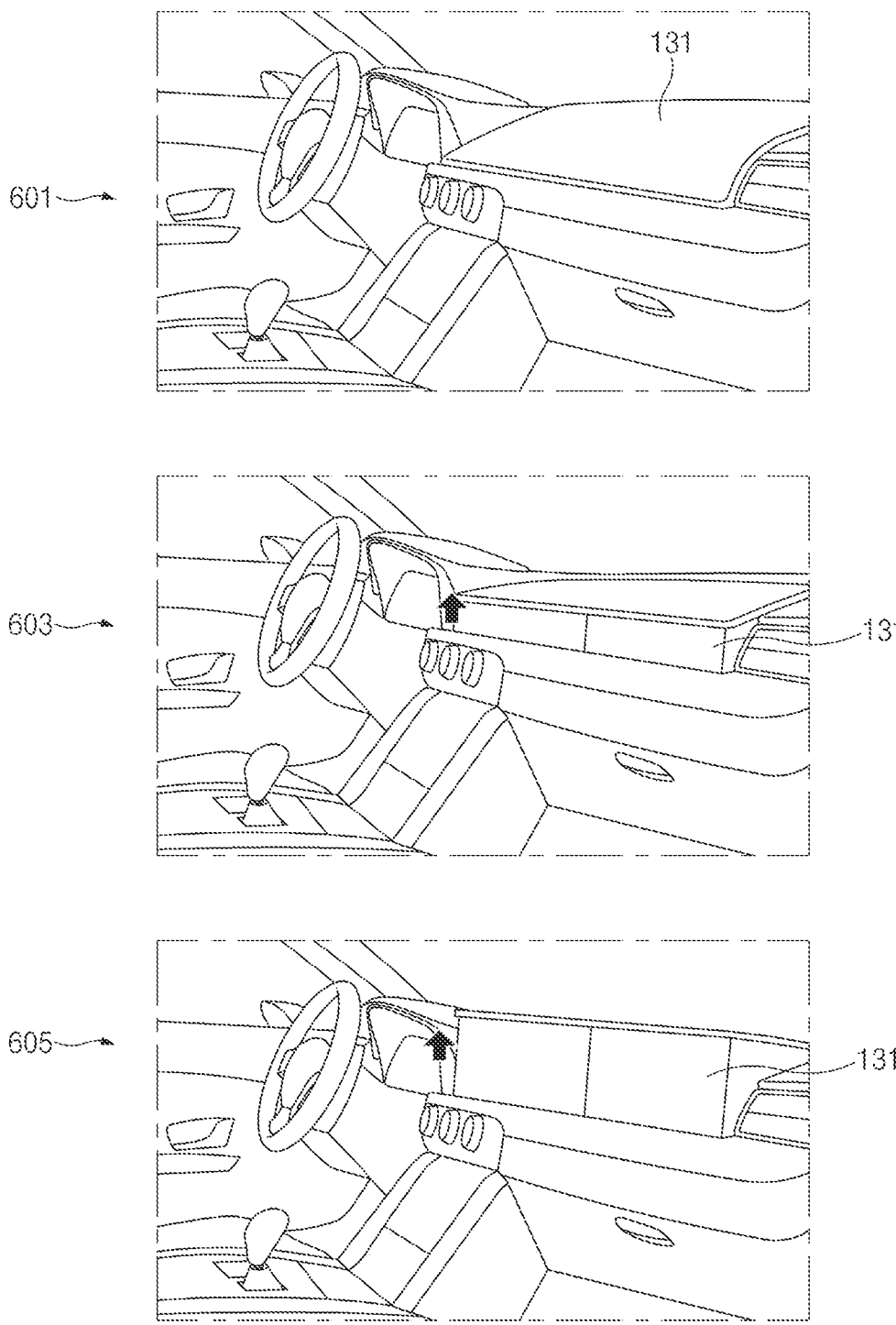
FIG. 6 illustrates a display size change according to various embodiments.

FIG. 6 illustrates a display size change according to various embodiments.

Referring to reference number 601, the CID 131 is in a first state. For example, the CID 131 may be in a close state or a hidden state. According to an embodiment, the processor 150 may control the CID 131 to be in the first state based on the driving context. For example, when it is determined that the IVI level is 1 (e.g., a situation where concentration is required for driving), the processor 150 may prevent a driver's gaze from being dispersed, by controlling the CID 131 to be in a first state.

According to an embodiment, the processor 150 may control a user interface depending on the state of the CID 131. As changing the CID 131 (e.g., from a second or third state) to the first state, the processor 150 may display at least part of the information displayed on the CID 131, on the cluster screen 133 or the auxiliary display 135, 231, or 233. For example, the processor 150 may display information (e.g., navigation information, or the like) necessary for driving among pieces of information displayed on the CID 131, on the cluster screen 133.

According to an embodiment, the processor 150 may change a user interface for receiving a user input depending on the state change of the CID 131. For example, the processor 150 may display the application information previously displayed on the CID 131, on the cluster screen 133 depending on the state change of the CID 131. In this case, the processor 150 may receive an input to the corresponding application, using the auxiliary input means 170.

Referring to reference number 603, the CID 131 is in the second state. For example, the CID 131 may be in a half-open state, a sleek state, or a glance state. In this case, the CID 131 may be exposed by a specified first size. According to an embodiment, the processor 150 may control the CID 131 to be in the second state based on the driving context. For example, when it is determined that the IVI level is 2 (e.g., a situation where concentration is not required for driving, such as slow driving), the processor 150 may provide a user with a simple infotainment by controlling the CID 131 to be in the second state.

According to an embodiment, the processor 150 may control a user interface depending on the state of the CID 131. For example, when changing the CID 131 from the first state to the second state, the processor 150 may display at least part of information displayed on the cluster screen 133, on the CID 131. For example, the processor 150 may display driving-related information (e.g., navigation information, or the like) and/or simple infotainment (e.g., a music application, or the like) on the CID 131.

According to an embodiment, the processor 150 may change a user interface for receiving a user input depending on the state change of the CID 131. For example, the processor 150 may receive an input to the content displayed on the CID 131 through an input to the auxiliary input means 170. For another example, the processor 150 may receive an input to the content displayed on the CID 131 through the auxiliary input means 170 or the CID 131.

Referring to reference number 605, the CID 131 is in the third state. For example, the CID 131 may be in an open state, an immersive state, a full-stretch, or a full-view state. In this case, the CID 131 may be exposed by a specified second size (e.g., the entire display region of the CID 131). According to an embodiment, the processor 150 may control the CID 131 to be in the third state based on the driving context. For example, when it is determined that the IVI level is 3 (e.g., a situation where the driver's attention is not required, such as a stop situation), the processor 150 may provide the user (e.g., a driver or a passenger) with infotainment through the entire screen by controlling the CID 131 to be in the third state.

According to an embodiment, the processor 150 may control a user interface depending on the state of the CID 131. For example, when changing the CID 131 from the second state to the third state, the processor 150 may display the content (e.g., multimedia and/or applications) on the CID 131 as much as possible. For example, the processor 150 may display infotainment-related information (e.g., multimedia, and/or applications) on the CID 131 together with driving-related information (e.g., navigation information, or the like).

According to an embodiment, the processor 150 may change a user interface for receiving a user input depending on the state change of the CID 131. For example, the processor 150 may receive an input to the content displayed on the CID 131, through a touch input to the CID 131. For another example, the processor 150 may use the CID 131 as a main user interface; the processor 150 may use the auxiliary input means 170 as a secondary user interface.

In the embodiment of FIG. 6, the change of the CID 131 according to three IVI levels has been described. However, the change level of the CID 131 is not limited thereto. For example, the CID 131 may be controlled in two states (e.g., the close or open state). For another example, the CID 131 may be controlled to be in four or more states.

Hereinafter, a structure according to an embodiment for changing the state of the CID 131 will be described with reference to FIG. 7.

Figure 7:
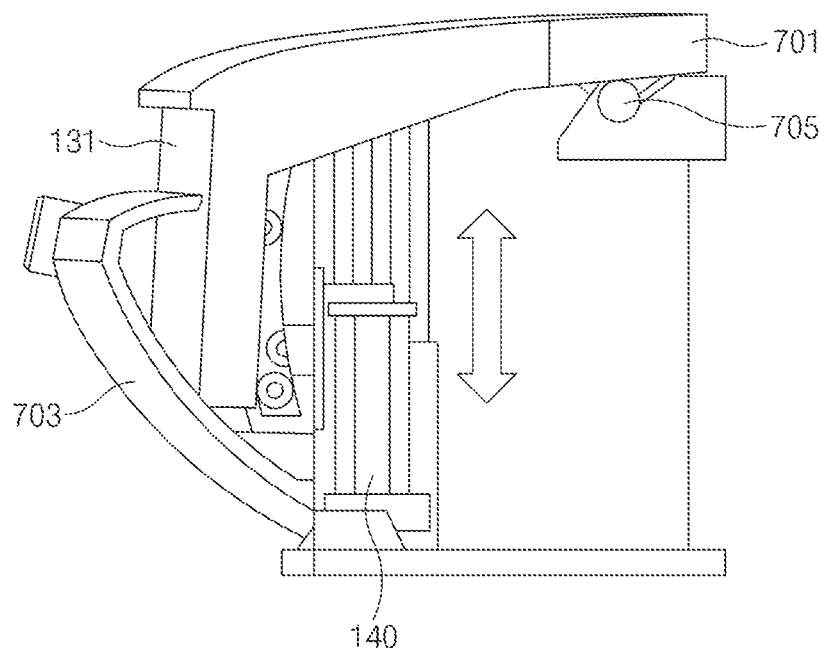
FIG. 7 shows a dashboard structure for changing a display size according to an embodiment.

FIG. 7 shows a dashboard structure for changing a display size according to an embodiment.

Referring to FIG. 7, the processor 150 may control the size of the exposed region of the CID 131, using the driving module 140. For example, the processor 150 may control the size of the CID 131 exposed from a lower cover 703, by lifting the CID 131 connected to an upper cover 701 with respect to a hinge part 705. As described above with reference to FIG. 6, the processor 150 may control the size of the exposed region of the CID 131 based on a driving context or IVI level, using the driving module 140.

In the embodiment of FIG. 7, the driving module 140 is illustrated as a cylinder (e.g., a hydraulic or pneumatic cylinder), but the driving module 140 is not limited thereto. For example, the driving module 140 may be composed of at least one gear and a motor. For another example, the driving module 140 may include a motor and a belt.

The driving module 140 may be set differently depending on the shape of the CID 131. In FIG. 7, the CID 131 is illustrated as a flat display, but the shape of the CID 131 is not limited thereto. According to an embodiment, the CID 131 may be a flexible display. For example, the driving module 140 may change the size of the exposed region of the CID 131 for one direction, by changing the curvature of the CID 131 positioned between the upper cover 701 and the lower cover 703. According to another embodiment, the CID 131 may be a rollable display. For example, the driving module 140 may be positioned on the upper cover 701 or the lower cover 703; the driving module 140 may change the size of the exposed region of the CID 131 by rolling up the CID 131. According to still another embodiment, the CID 131 may be a foldable display. For example, the driving module 140 may change the size of the exposed region of the CID 131 by controlling at least one hinge part of the CID 131.

According to an embodiment, the CID 131 may protrude from the upper cover 701. For example, the upper cover 701 and the lower cover 703 may be fixed; the processor 150 may control the size of the exposed region of the CID 131 by protruding the CID 131 to the outside of the upper cover 701 using the driving module 140.

The structure for changing the size of the CID 131 has been described with reference to FIG. 7. Hereinafter, examples of changing a user interface according to the size change of the CID 131 will be described with reference to FIGS. 8 to 10.

Figure 8:
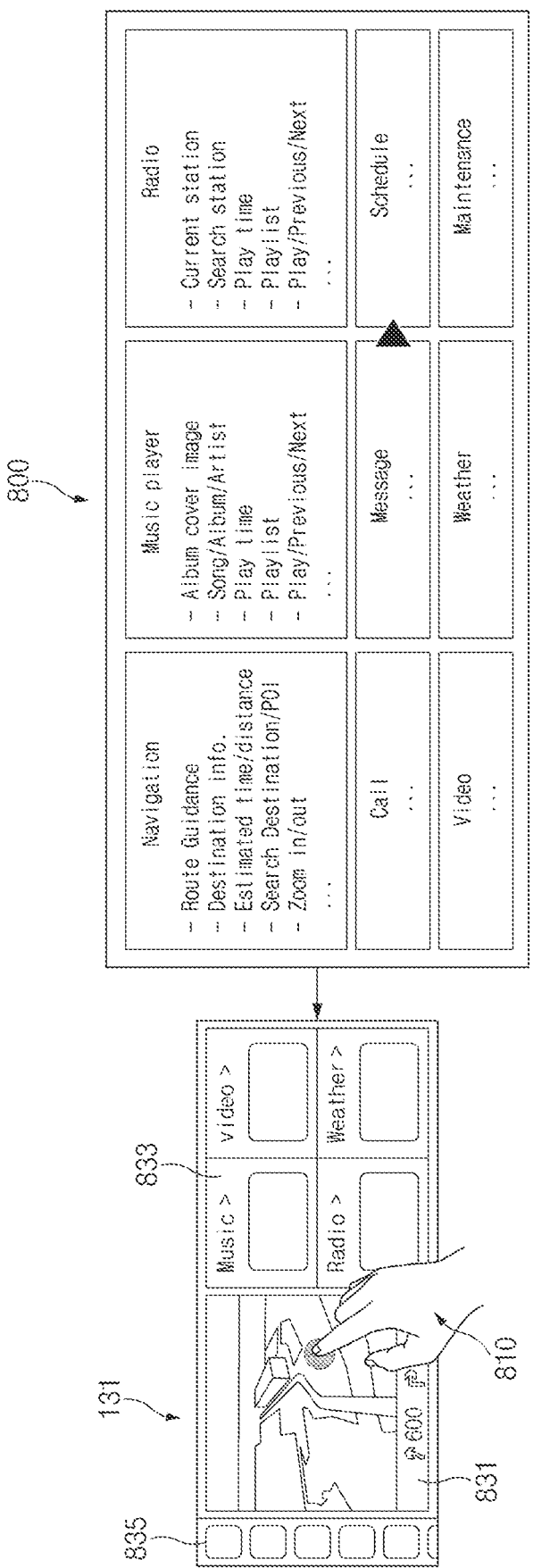
FIG. 8 illustrates a UI according to an embodiment.

FIG. 8 illustrates a UI according to an embodiment.

Referring to FIG. 8, it is assumed that the CID 131 is in a third state. For example, the CID 131 may be in a state such as reference numeral 605 of FIG. 6.

According to an embodiment, the CID 131 of the third state may display a third display region 835, a first display region 831, and a second display region 833. For example, the processor 150 may display a specified UI set on the CID 131 depending on the state (e.g., the size of an exposed region, the aspect ratio of the exposed region, and/or resolution) of the CID 131. For another example, the processor 150 may dynamically determine information to be displayed on the CID 131, depending on the state of the CID 131.

According to an embodiment, an application table 800 may be stored in the memory 120. For example, the application table 800 may include applications and information associated with each application.

According to an embodiment, the application table 800 may include the priority of an application and/or the priority of information associated with an application. For example, in the application table 800, a navigation application may have a high priority. In addition, route guidance and destination information among information associated with the navigation application may have a higher priority than other information. According to an embodiment, the processor 150 may display as many applications and application-related information as possible, on the CID 131 in the third state based on the priority. For example, the number of applications capable of being displayed for each state of the CID 131 and/or the number of application-related information may be predetermined.

According to an embodiment, the priority may be set for each display region. For example, the first display region 831 may have a higher priority than the second display region 833; the second display region 833 may have a higher priority than the third display region 835.

According to an embodiment, the amount of information to be displayed for each display region may be set. For example, the number of applications capable of being displayed in the first display region 831 may be less than the number of applications capable of being displayed in the second display region 833; the number of applications capable of being displayed in the second display region 833 may be smaller than the number of applications capable of being displayed in the third display region 835. For example, as the priority for each display region is higher, the less number of applications may be displayed; more detailed (e.g., more) information may be displayed in a display region having a higher priority.

According to an embodiment, the application table 800 may include applications to be displayed depending on the state of the CID 131 and information associated with applications. The processor 150 may display the applications and the information associated with applications, which are specified in the application table 800, on the CID 131 depending on the state of the CID 131.

According to an embodiment, the processor 150 may receive an input through a touch input 810 to the CID 131, with respect to the content displayed on the CID 131 in the third state. According to another embodiment, the processor 150 may use the auxiliary input means 170 as an auxiliary user interface, with respect to the content displayed on the CID 131.

According to an embodiment, the first display region 831 may be used to display an application associated with driving, such as a navigation application. For example, the first display region 831 may be a region for displaying an application having a high priority or an application selected by a user input. The processor 150 may display information associated with an application in the first display region 831, using a graphic element (e.g., map).

According to an embodiment, the second display region 833 may include at least one application and application-related information. For example, in the case of a music application, information such as an album cover image, a music title, artist information, playback time, or the like may be displayed in a part of the second display region 833. When an input to the second display region 833 is received, the processor 150 may display the corresponding application in at least part of the first display region 831 and/or the second display region 833.

According to an embodiment, the third display region 835 may include icons of a plurality of applications. For example, the processor 150 may display the corresponding application to the first display region 831 and/or the second display region 833, in response to an input to one application in the third display region 835.

Figure 9:
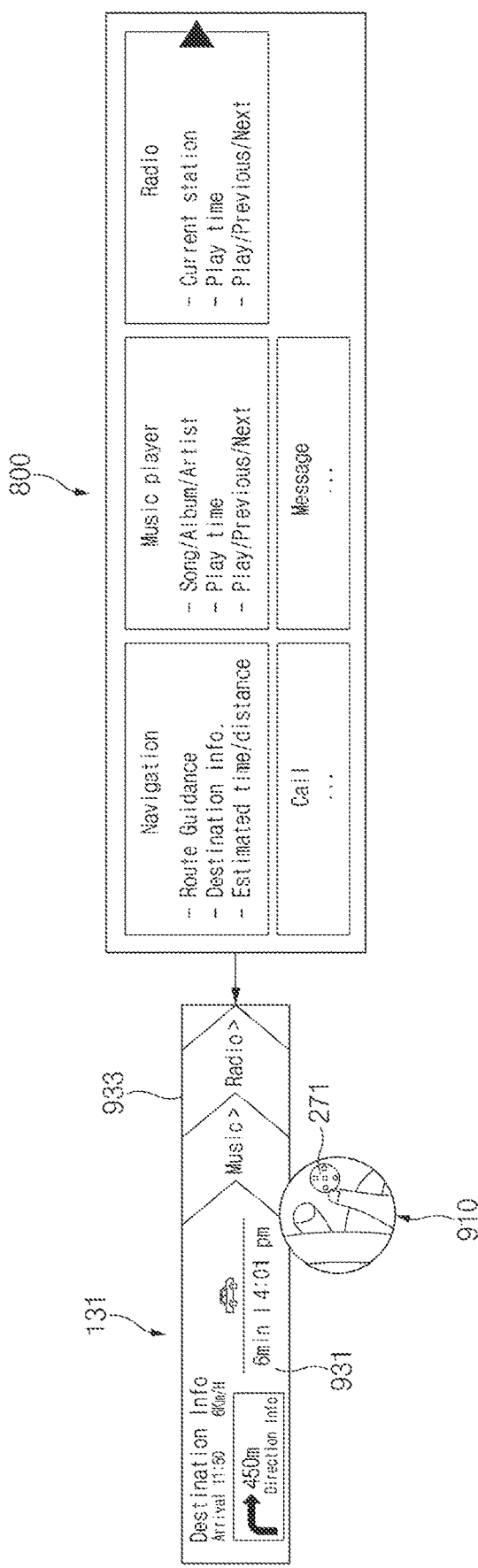
FIG. 9 illustrates a UI according to another embodiment.

FIG. 9 illustrates a UI according to another embodiment.

Referring to FIG. 9, it is assumed that the CID 131 is in a second state. For example, the CID 131 may be in a state as illustrated in reference numeral 603 of FIG. 6.

According to an embodiment, the CID 131 in the second state may display a first display region 931 and a second display region 933. For example, the processor 150 may display the specified UI set on the CID 131 depending on the second state of the CID 131. For another example, the processor 150 may dynamically determine information to be displayed on the CID 131, depending on the state of the CID 131.

According to an embodiment, the processor 150 may receive a user input 910 through the auxiliary input device 271 (e.g., the auxiliary input means 170) with respect to the content displayed on the CID 131 in the second state.

According to an embodiment, the processor 150 may display an application having a high priority, in the first display region 931. The processor 150 may display the user interface of a navigation application in the shape different from that of the first display region 831 of FIG. 8, depending on the changed display size. For example, as illustrated in FIG. 9, only the information (e.g., route guidance, destination information, the remaining time required to reach the destination, the expected arrival time, or the like) having a higher priority among information associated with the navigation may be displayed in the first display region 931.

According to an embodiment, the processor 150 may display a user interface for selecting at least one application having a high priority among applications, which are not displayed in the first display region 931, in the second display region 933. For example, the second display region 933 may include only the application name.

According to an embodiment, the processor may change the configurations of the first display region 931 and the second display region 933, based on the user input 910. For example, when the input (e.g., the input in the right direction of an auxiliary input device) to a music application is received, the processor 150 may reduce information about the navigation (e.g., displaying only the navigation name) and may expand and display information about music.

Figure 10:
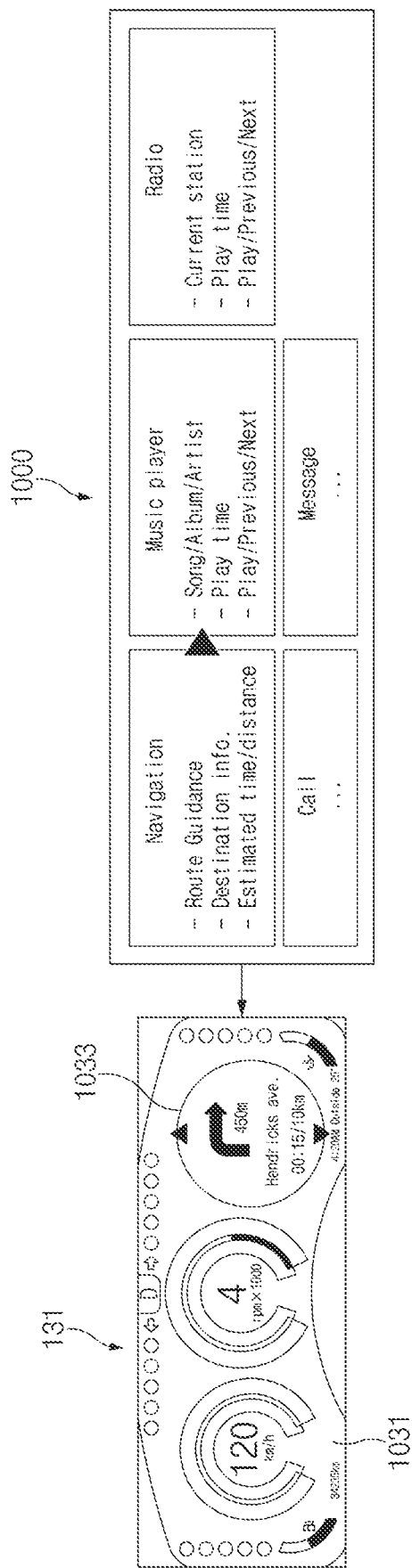
FIG. 10 illustrates a UI according to another embodiment.

FIG. 10 illustrates a UI according to another embodiment.

Referring to FIG. 10, it is assumed that the CID 131 is in a first state. For example, the CID 131 may be in a state as illustrated in reference numeral 601 of FIG. 6.

According to an embodiment, as illustrated in FIG. 6, the CID 131 in the first state may be in a close state. In this case, the processor 150 may display information (e.g., information related to operation) having a high priority on at least part of the cluster screen 133.

According to an embodiment, the processor 150 may display information (e.g., speed, RPM, or the like) necessary for driving in a first display region 1031 of the cluster screen 133 and may display application information (e.g., navigation information, or the like) having a high priority in a second display region 1033. The processor 150 may change the UI of the cluster screen 133 depending on the display of the second display region 1033. In addition, to display information of an application having a high priority, the processor 150 may change the UI of the application in the shape suitable for the second display region 1033.

According to an embodiment, the processor 150 may receive a user input through the auxiliary input device 271 (e.g., the auxiliary input means 170) with respect to the second display region 1033. For example, the processor 150 may change an application to be displayed in the second display region 1033 based on a user input. According to an embodiment, the processor 150 may change an application to be displayed based on a priority. For example, when the application table 800 is sorted depending on a priority, the processor 150 may change an application depending on the order (e.g., the order of navigation, music, radio, a phone, and a message) of the application table 800 with respect to the user input in one direction.

According to an embodiment, the processor 150 may display an application having a high priority, in the first display region 931. The processor 150 may display the user interface of a navigation application in the shape different from that of the first display region 831 of FIG. 8, depending on the changed display size. For example, as illustrated in FIG. 9, only the information (e.g., route guidance, destination information, the remaining time required to reach the destination, the expected arrival time, or the like) having a higher priority among information associated with the navigation may be displayed in the first display region 931.

According to an embodiment, the processor 150 may display a user interface for selecting at least one application having a high priority among applications, which are not displayed in the first display region 931, in the second display region 933. For example, the second display region 933 may include only the application name.

According to an embodiment, the processor may change the configurations of the first display region 931 and the second display region 933, based on the user input 910. For example, when the input (e.g., the input in the right direction of an auxiliary input device) to a music application is received, the processor 150 may reduce information about the navigation (e.g., displaying only the navigation name) and may expand and display information about music.

The change of a user interface (an output UI and an input device) has been described with reference to FIGS. 8 to 10. Hereinafter, further other examples of UI change are described with reference to FIGS. 11 and 12.

Figure 11:
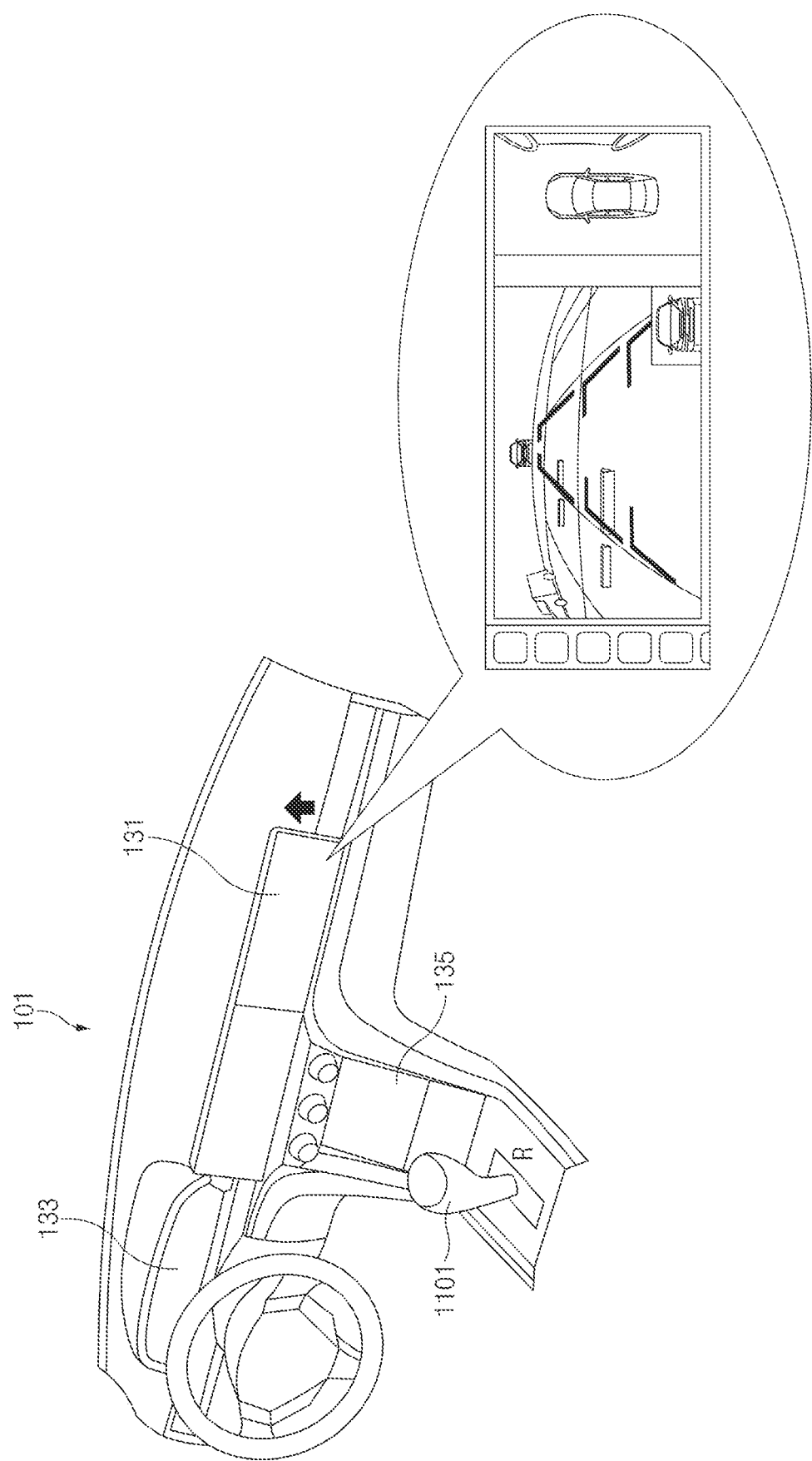
FIG. 11 illustrates a UI change according to an embodiment.

FIG. 11 illustrates a UI change according to an embodiment.

In FIG. 11, when a gear 1101 of a transportation device is changed to a reverse gear R, the processor 150 may control the CID 131 to be in a third state (e.g., a fully open state). Furthermore, the processor 150 may display information obtained through the rear camera of the transportation device on the CID 131. For example, the processor 150 may display a Reverse guide together to reverse the transportation device.

According to another embodiment, when the gear 1101 of the transportation device is changed to park gear P, the processor 150 may control the CID 131 to be in the third state (e.g., a fully open state).

According to an embodiment, even though the speed of the transportation device exceeds a specified value, when the gear 1101 is in the reverse state, the processor 150 may maintain the CID 131 in the third state without changing to the second state. For example, the state of the gear 1101 may be defined as a rule having a higher priority than the driving speed.

Figure 12:
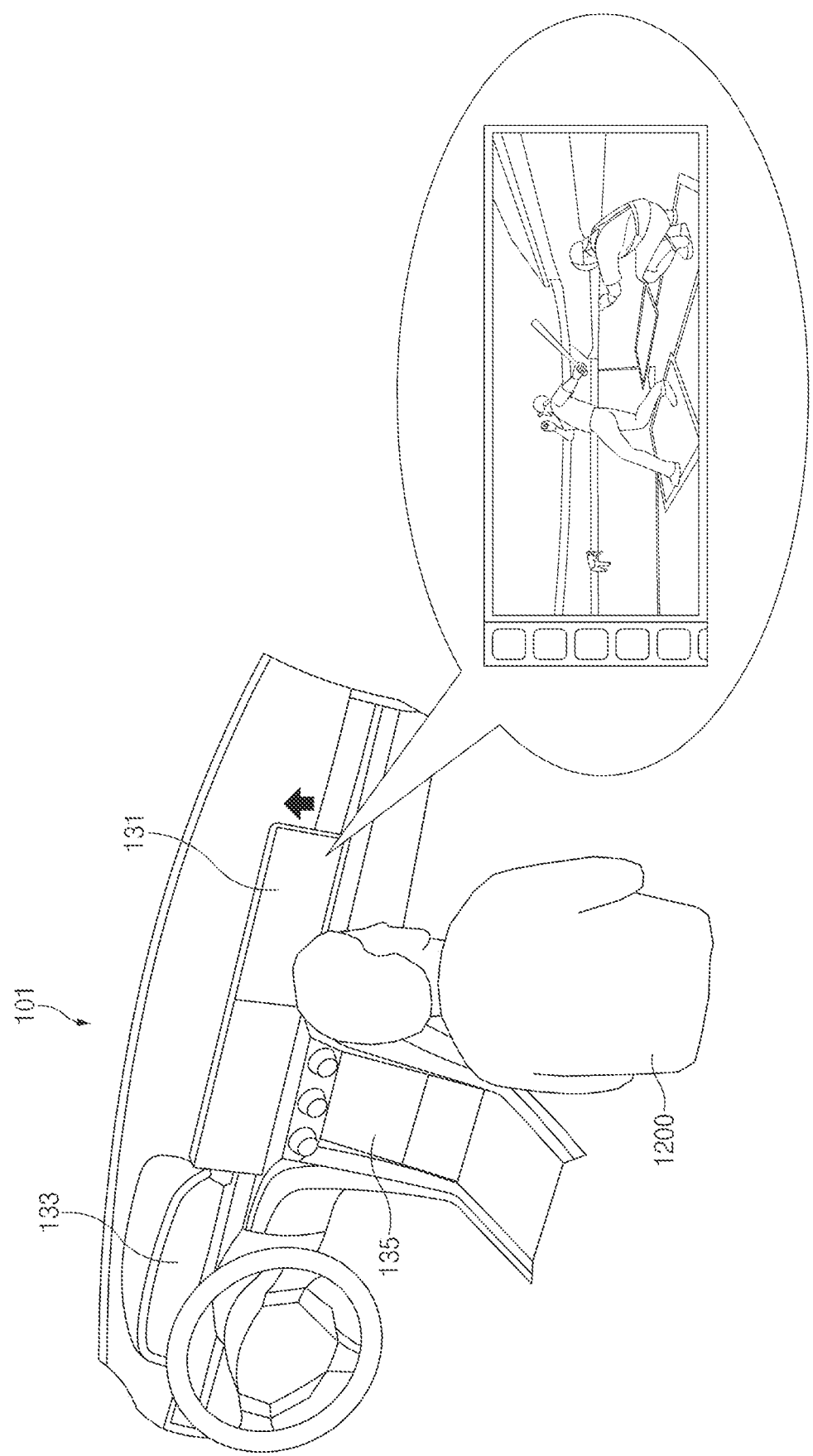
FIG. 12 illustrates a UI change according to another embodiment.

FIG. 12 illustrates a UI change according to another embodiment.

According to an embodiment, the processor 150 may determine the boarding of a passenger 1200, using the sensor module 160. For example, the processor 150 may determine the boarding of the passenger 1200, based on whether the seat belt is engaged. For another example, the processor 150 may determine the boarding of the passenger 1200 based on the pressure and/or weight applied to a seat.

According to an embodiment, the processor 150 may determine the boarding of the passenger 1200, using the communication module 110. For example, the processor 150 may determine the boarding of the passenger 1200 by searching for an electronic device (e.g., the external device 410) of the passenger 1200 using the communication module 110. For another example, when the electronic device of the passenger 1200 is connected, the processor 150 may determine the boarding of the passenger 1200. For another example, the processor 150 may determine the boarding of the passenger 1200 by searching for an electronic device and measuring the location of the electronic device. The processor 150 may determine the electronic device-based boarding of the passenger 1200, based on a received signal strength indicator (RSSI), angle of arrival (AoA), angle of departure (AoD), and/or time of flight (ToF).

According to an embodiment, when it is determined that the passenger 1200 is on board, the processor 150 may control the CID 131 to be in the third state. For example, the processor 150 may display the multimedia content stored in the electronic device of the passenger 1200 on the CID 131.

Figure 13:
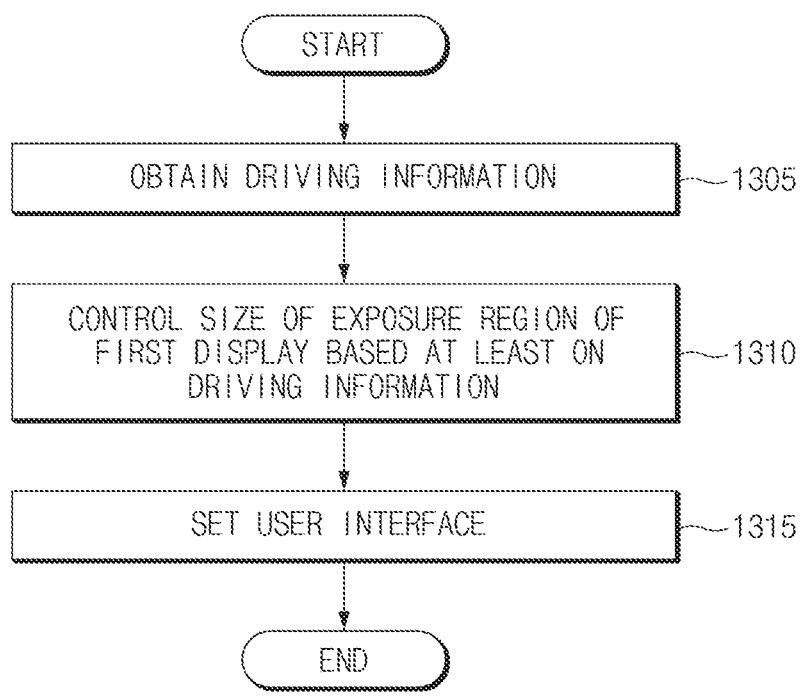
FIG. 13 is a flowchart of a display controlling method according to various embodiments.

FIG. 13 is a flowchart of a display controlling method according to various embodiments.

In operation 1305, the processor 150 may obtain driving information of the electronic device 101 or a transportation device including the electronic device 101. According to an embodiment, the processor 150 may obtain driving information, using the sensor module 160. For example, the driving information may include a gear state, an autonomous function state, a driving mode, and/or speed. For example, the gear state may include Drive, Neutral, Reverse, and Park. The autonomous function state may include whether cruise control is applied, whether LDW is applied, and/or whether automatic driving is applied. The driving mode may include a sports mode, a comfort mode, and/or an eco-mode.

According to an embodiment, the processor 150 may further determine whether a passenger is on board. The determination of whether a passenger is on board may be referenced by the method described above with reference to FIG. 12.

In operation 1310, the processor 150 may control the size of the exposed region of the first display (e.g., the CID 131) based at least on driving information. According to an embodiment, the processor 150 may control the size of the exposed region of the first display, using the driving module 140.

According to an embodiment, the processor 150 may determine an infotainment level based on the driving information. For example, when the driving information satisfies a specified first condition, the processor 150 may determine that the infotainment level is a first infotainment level; when the driving information satisfies a specified second condition, the processor 150 may determine that the infotainment level is a second infotainment level. For convenience of description, only two levels have been described, but three or more infotainment levels may be present.

According to an embodiment, the processor 150 includes a plurality of groups associated with the driving information and may set different priorities for respective groups. For example, the processor 150 may configure the driving information with a plurality of groups including a gear state, a driving mode, and an autonomous function. For example, the processor 150 may assign a higher priority to a gear state than the driving mode and autonomous function. For another example, the processor 150 may assign the autonomous function to a higher priority than the driving mode.

According to an embodiment, when a group having the high priority satisfies a specified condition, the processor 150 may determine the infotainment level regardless of the group having a low priority. For example, when the gear state having the high priority is Reverse, Park, or Neutral, the processor 150 may determine that the infotainment level is the first infotainment level. When the gear state is Drive D, the processor 150 may determine the infotainment level based on the remaining driving information (e.g., the autonomous function and the driving mode). For example, when the gear state is 'D', the autonomous driving is activated, and the driving mode is the comfort or eco mode, the processor 150 may determine that the infotainment level is the second infotainment level. For another example, when the gear state is 'D', and the autonomous function is disabled, or the driving mode is a sports mode, the processor 150 may determine that the infotainment level is the third infotainment level.

According to an embodiment, the processor 150 may control the size of the exposed region of the first display based on the infotainment level. For example, the processor 150 may maximally control the exposed region of the first display at the first infotainment level. The processor 150 may minimally control the exposed region of the first display at the third infotainment level. In addition, the processor 150 may control the exposed region of the first display to a specified size between minimum and maximum at the second infotainment level.

According to an embodiment, the processor 150 may determine the infotainment level by using whether a passenger is on board, as the highest priority rule or an exception rule. For example, when a passenger is on board, the processor 150 may determine the first infotainment level.

In operation 1315, the processor 150 may set a user interface. According to an embodiment, the processor 150 may set a user interface based on the size of the exposed region of a first display.

According to an embodiment, the processor 150 may change the type and amount of information to be displayed in the exposed region of the first display, based on the size (e.g., a size, an aspect ratio, and/or a resolution) of the exposed region of the first display. The processor 150 may change the shape of the user interface to be displayed in the exposed region of the first display, based on the size of the exposed region of the first display.

According to an embodiment, the processor 150 may change a user interface for an input to information displayed on the first display, based on the size of the exposed region of the first display. For example, when the first display is exposed maximally or by a specified range or more, the processor 150 may receive a user input (e.g., a touch input) through the first display. When the first display is exposed by less than a specified range, the processor 150 may receive a user input through an auxiliary input device (e.g., the auxiliary input means 170).

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software including an instruction stored in a machine-readable storage media (e.g., the memory 120) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 150), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

What is claimed is:

1. An information displaying device for use in a vehicle, the device comprising:
    a first display;
    a driving unit configured to control a size of an exposed region of the first display; and
    a processor configured to control the first display, and the driving unit,
    wherein the processor is configured to:
        obtain driving information of the vehicle, the driving information including transmission state information of the vehicle and information for an autonomous driving function;
        when the transmission state information indicates a position other than drive, control the size of the exposed region of the first display to be a first size, using the driving unit;
        when the transmission state information indicates drive and the driving information indicates that the autonomous driving function is enabled, control the exposed region of the first display to be a second size that is less than the first size, using the driving unit;
        when the transmission state information indicates drive and the driving information indicates that the autonomous driving function is disabled, control the exposed region of the first display to be less than the second size, using the driving unit.

2. The device of claim 1, further comprising a second display and an auxiliary input interface configured to receive a user input.

3. The device of claim 2, wherein the processor is further configured to:
    set a user interface for receiving a user input associated with content displayed on the first display, to at least one of the first display, the second display, and the auxiliary input interface based on a size of the exposed region of the first display.

4. The device of claim 2, wherein the processor is further configured to:
    when the transmission state information indicates a position other than drive, display the content on the first display and set the user interface to the first display.

5. The device of claim 2, wherein the processor is further configured to:
    when the transmission state information indicates drive and the driving information indicates the autonomous driving function is enabled, display the content on the first display and set the user interface to the auxiliary input interface.

6. The device of claim 2, wherein the processor is further configured to:
    when the transmission state information indicates drive and the driving information indicates that the autonomous driving function is disabled, display the content on the second display and set the user interface to the second display.

7. The device of claim 2, wherein the processor is further configured to:
    when the exposed region of the first display is less than the first size, set the user interface to the auxiliary input interface or the second display.

8. The device of claim 1, wherein the autonomous driving function comprises at least one of an auto-pilot function, a cruise control function, and a lane departure warning function.

9. The device of claim 1, wherein the processor is further configured to:
    change a type, amount and layout of the content displayed on the first display, based on the size of the exposed region.

10. The device of claim 1, wherein the processor is configured to, when the boarding of the passenger is sensed, control the exposed region of the first display to be greater than or equal to the first size.

11. The device of claim 1, wherein:
    the first display includes a rollable display; and
    the driving unit is configured to control the size of the exposed region of the first display by rolling-up or rolling-down the first display.

12. A method for controlling an information displaying device for use in a vehicle, the method comprising:
    obtaining driving information of the vehicle, the driving information including transmission state information of the vehicle and information for an autonomous driving function; and
    when the transmission state information indicates a position other than drive, controlling a size of an exposed region of a first display to be a first size;
    when the transmission state information indicates drive and the driving information indicates that the autonomous driving function is enabled, controlling the exposed region of the first display to be a second size that is less than the first size; and when the transmission state information indicates drive and the driving information indicates that the autonomous driving function is disabled, controlling the exposed region of the first display to be less than the second size.

13. The method of claim 12, further comprising:

setting a user interface for receiving a user input associated with content displayed on the first display, to at least one of the first display, a second display, and an auxiliary input interface based on a size of the exposed region of the first display.

14. The method of claim 13, when the transmission state information indicates a position other than drive, further comprising displaying the content on the first display and setting the user interface to the first display.

15. The method of claim 13, when the transmission state information indicates drive and the driving information indicates the autonomous driving function is enabled, further comprising displaying the content on the first display and setting the user interface to the auxiliary input interface.

16. The method of claim 13, when the transmission state information indicates drive and the driving information indicates that the autonomous driving function is disabled, further comprising displaying the content on the second display and setting the user interface to the second display.

17. The method of claim 12, further comprising:

when the exposed region of the first display is less than the first size, setting the user interface to the second display or the auxiliary input interface.

18. The method of claim 12, further comprising:

change a type, amount, and layout of the content displayed on the first display, based on the size of the exposed region.

19. The method of claim 12, wherein the autonomous driving function comprises at least one of an auto-pilot function, a cruise control function, and a lane departure warning function.

20. The method of claim 12, further comprising:

detecting an external electronic device using a communication circuit;

sensing boarding of the passenger based on the detected external electronic device; and controlling the exposed region of the first display to be greater than or equal to the first size.

* * * * *